United States Patent [19] [11] 4,245,860
Hinds [45] Jan. 20, 1981

[54] MISSILE HOISTING SLING

[75] Inventor: Farley T. Hinds, Fort Walton Beach, Fla.

[73] Assignee: The United States of America as represented by the Secretary of the Air Force, Washington, D.C.

[21] Appl. No.: 35,580

[22] Filed: May 3, 1979

[51] Int. Cl.[3] .......... B64C 1/22
[52] U.S. Cl. .......... 294/74; 244/137 R
[58] Field of Search .......... 294/74, 67 DC, 67 DE, 294/78 R, 78 A, 79, 80, 82 R; 414/626; 244/137 R

[56] References Cited

U.S. PATENT DOCUMENTS

| | | | |
|---|---|---|---|
| 3,355,114 | 11/1967 | Motz | 294/74 |
| 3,712,567 | 1/1973 | Ruggeri | 244/137 R |
| 4,124,244 | 11/1978 | Bryant | 294/74 |

*Primary Examiner*—James B. Marbert
*Attorney, Agent, or Firm*—Donald J. Singer; Arsen Tashjian

[57] ABSTRACT

A hoisting sling for handling a missile by its mounting lugs wherein the aft lugs include a matched pair of inwardly facing spaced apart angled members fixedly attached to the body of the missile and the forward lug includes an upwardly extending headed pin element. The sling consists of a heavy flat textile tape with a forward slotted grip on one end for engaging the forward headed lug and an angled grip on the other end for sliding engagement with the rearward spaced lugs on the missile so that the missile can be lifted and transported by engagement with a standard fork lift truck.

1 Claim, 1 Drawing Figure

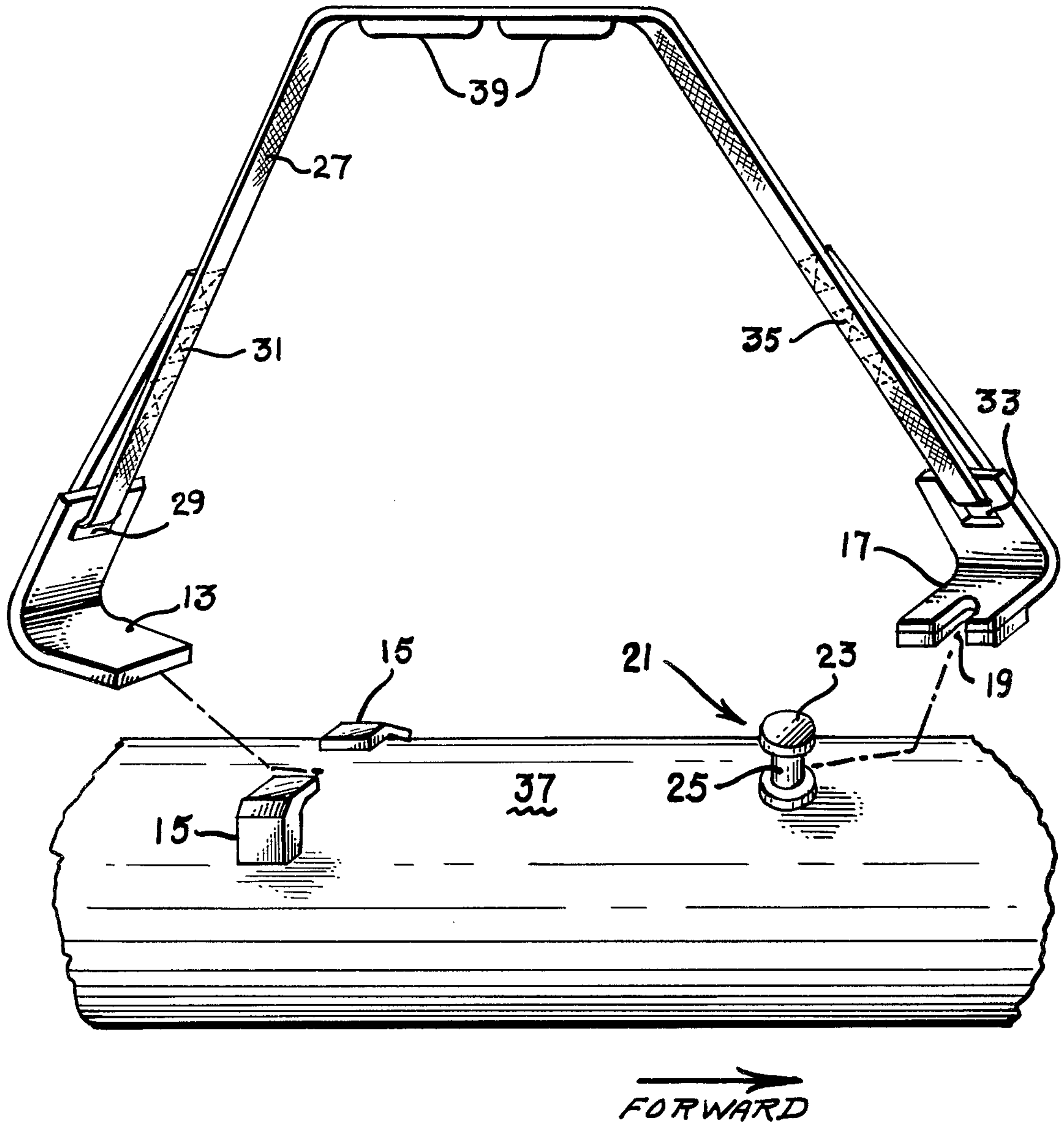
39
27
31
35
33
29
17
13
15
21
23
19
15
37
25
FORWARD

MISSILE HOISTING SLING

STATEMENT OF GOVERNMENT INTEREST

The invention described herein may be manufactured and used by or for the Government for governmental purposes without the payment of any royalty thereon.

BACKGROUND OF THE INVENTION

This invention relates to a sling for handling missiles and, more particularly, the invention is concerned with providing a missile hoisting sling which engages the mounting lugs on the missile body to allow the missile to be lifted and transported with greater ease and safety.

Heretofore, it has been common practice to lift and transport missiles by wrapping a sling around the missile at or near the center of gravity and attaching the ends to a lifting means such as a fork lift truck. This procedure requires that the missile be spaced from a flat surface so that the sling can be positioned under and around the missile. Certain difficulties are obvious in order to raise the missile off the flat surface and attach the sling for the lifting operation.

Another problem which arises with the presently used wrap around slings is the location of the center of gravity. If not correctly placed, that is, at some point other than the center of gravity, the missile could slide out of the sling causing possible damage to the missile and injury to personnel and equipment. Also, when it is necessary to keep the missile in a certain position so that the bottom is at the lowermost point, the presently available slings require that the missile be turned and adjusted to come into alignment during placement in the container.

Thus, it can be seen that it would be most desirable if the missile could be lifted easily and safely off a flat surface without the necessity of locating the exact center of gravity each time. The hereinafter described invention does provide a sling which is safer because it lifts the missile from its exact center of gravity every time and automatically holds the missile in the correct position so the bottom of the missile is down. The handling time required to lift and transport the missiles is greatly reduced.

SUMMARY OF THE INVENTION

The present invention is concerned with providing a missile hoisting sling for safely and expeditiously lifting and transporting a missile such as, for example, the AIM-7F, from its all-up-round container. The sling includes two custom made metal grips at each end of a nylon webbing strap. The grips engage the mounting lugs on the top of the missile in such a way that the lift is always at the center of gravity and the bottom of the missile is always exactly oriented downward.

Accordingly, it is an object of the invention to provide a missile hoisting sling for safely and easily handling a missile, such as the AIM-7F, by engaging its mounting lugs with custom made grips on each end of a nylon strap.

Another object of the invention is to provide a hoisting sling for removing and/or replacing a missile stored in a CNU-305/E all-up-round container by attaching custom grips to the mounting lugs on the missile. The antenna tunnel which runs along the bottom of the missile automatically lines up with channels in the cushions in the container during the replacement procedure.

Still another object of the invention is to provide a missile hoisting sling which allows the missile to be quickly and safely lifted from any surface, even a flat surface, without incident and without the danger of slippage caused by incorrect rigging at a point not at the center of gravity.

A further object of the invention is to provide a missile hoisting sling wherein the handling time is reduced to a minimum because it is quicker and easier to attach to the missile.

These and other objects, features and advantages will become more apparent after considering the following detailed description taken in conjunction with the annexed drawing and appended claims.

BRIEF DESCRIPTION OF THE DRAWING

The drawing FIGURE is a general view in perspective of a missile hoisting sling according to the invention showing the sling with its custom made lugs being positioned for attachment to the mounting lugs on an AIM-7F missile.

DESCRIPTION OF A PREFERRED EMBODIMENT

Referring now to the drawing, there is shown a missile hoisting sling according to the invention including a rearward grip 13 which engages the rearward lugs 15 by sliding between and under them. A forward grip 17 is provided with a slot 19 for engagement with the forward or launch lug 21 which includes the head portion 23 and the upright pin portion 25.

A heavy nylon strap 27 connects the rearward and forward grips 13 and 17 by passing through the slot 29 in the rearward grip 13 and fixedly attached to itself by the stitching 31. Likewise, the nylon strap 27 passes through the slot 33 in the grip 17 and is attached to itself by the stitching 35. The lugs 15 and 21 are fixedly attached to the missile 37 which may be, for example, an AIM-7F type.

In operation, the sling is lowered by a fork truck until the grip 13 can be slipped under to lugs 15 and the slot 19 in the grip 17 is positioned around the pin portion 25 of the lug 21. The sling is then raised by means of the forks 39 on a fork lift truck (not shown) which causes the missile 37 to rise upward to the desired height. The missile 37 is always held at the center of gravity and always in the proper position with the bottom down.

Thus it can be seen that the hereinbefore described invention allows the removing and/or replacing of a missile in its all-up-around container safely and quickly with a minimum of effort. The requirement for rotating the missile while suspended in the sling is eliminated and the hook up time for attaching the sling to the missile is greatly reduced.

Although the invention has been illustrated in the foregoing specification in terms of a preferred embodiment thereof, the invention is not limited to this embodiment or to the particular configuration shown and described. It will be apparent to those skilled in the art that certain changes, modifications and substitutions can be made particularly with respect to the shape and positioning of the elements without departing from the true spirit and scope of the appended claims. It should be noted, for example, that a cable or chain could be utilized in place of the nylon strap and that the grips could be modified to accomodate the lugs on most all missiles presently in use by the Air Force and Navy.

Having thus set forth the nature of my invention, what I claim and desire to secure by Letters Patent of the United States is:

1. A hoisting sling for removing and replacing a missile having forward and rearward lugs thereon from an all up around container, said sling comprising a rearward grip for engagement with the rearward lugs on the missile, said rearward grip being an angled member for sliding under and between spaced apart rearward lugs on the missile, a forward grip for engagement with the forward lug on the missile, said forward grip being an angled metal member having a slot therein for sliding under the head of and around the upright pin portion of the forward lug on the missile, and a nylon strap fixedly attached between the upper portions of said rearward and forward grips for engaging a hoist means, thereby allowing the missile to be safely and easily lifted from its container and replaced therein.

* * * * *